United States Patent
Sakurai

(10) Patent No.: US 12,164,208 B2
(45) Date of Patent: Dec. 10, 2024

(54) OPTICAL SYSTEM

(71) Applicant: santec Holdings Corporation, Aichi (JP)

(72) Inventor: Yasuki Sakurai, Aichi (JP)

(73) Assignee: santec Holdings Corporation, Aichi (JP)

( * ) Notice: Subject to any disclaimer, the term of this patent is extended or adjusted under 35 U.S.C. 154(b) by 0 days.

(21) Appl. No.: 17/800,023

(22) PCT Filed: Feb. 19, 2020

(86) PCT No.: PCT/JP2020/006514
§ 371 (c)(1),
(2) Date: Aug. 16, 2022

(87) PCT Pub. No.: WO2021/166119
PCT Pub. Date: Aug. 26, 2021

(65) Prior Publication Data
US 2023/0072583 A1    Mar. 9, 2023

(51) Int. Cl.
*G02F 1/137* (2006.01)
*C09K 19/02* (2006.01)
*C09K 19/56* (2006.01)

(52) U.S. Cl.
CPC ...... *G02F 1/13793* (2021.01); *C09K 19/0275* (2013.01); *C09K 19/56* (2013.01)

(58) Field of Classification Search
CPC .. G02F 1/13793; C09K 19/0275; C09K 19/56
(Continued)

(56) References Cited

U.S. PATENT DOCUMENTS

| 2009/0109405 A1* | 4/2009 | Horikawa | G02B 27/46 348/E5.142 |
| 2012/0099031 A1* | 4/2012 | Kinoe | H04N 9/3158 349/8 |

(Continued)

FOREIGN PATENT DOCUMENTS

| JP | 2004170868 A | * | 6/2004 |
| JP | 2005135479 A | * | 5/2005 |

(Continued)

OTHER PUBLICATIONS

Espacenet English machine translation of JP2010224434A (Year: 2010).*

(Continued)

*Primary Examiner* — Dung T Nguyen
*Assistant Examiner* — David Y Chung
(74) *Attorney, Agent, or Firm* — Meunier Carlin & Curfman LLC

(57) ABSTRACT

An optical system in one aspect of the present disclosure includes a first light source, a second light source, a first spatial optical phase modulator, a second spatial optical phase modulator, and a projector. The first spatial optical phase modulator outputs first phase-modulated light based on an input light having a first wavelength from the first light source. The second spatial optical phase modulator outputs second phase-modulated light based on input light having a second wavelength from the second light source. The projector projects the first phase-modulated light and the second phase-modulated light on a target. The first spatial optical phase modulator is a liquid crystal device including a first liquid crystal layer. The second spatial optical phase modulator is a liquid crystal device including a second liquid crystal layer. The first liquid crystal layer includes a liquid (Continued)

crystal material different from that of the second liquid crystal layer.

8 Claims, 3 Drawing Sheets

(58) Field of Classification Search
USPC .......................................................... 349/5–9
See application file for complete search history.

(56) References Cited

U.S. PATENT DOCUMENTS

| | | |
|---|---|---|
| 2012/0229715 A1 | 9/2012 | Okumura |
| 2019/0219856 A1* | 7/2019 | Mizusaki ............... C09K 19/30 |

FOREIGN PATENT DOCUMENTS

| | | | |
|---|---|---|---|
| JP | 2007045894 A | * | 2/2007 |
| JP | 2008216579 A | | 9/2008 |
| JP | 2010224434 A | * | 10/2010 |
| JP | 2012185401 A | | 9/2012 |
| JP | 2015179292 A | | 10/2015 |

OTHER PUBLICATIONS

Espacenet English machine translation of JP2007045894A (Year: 2007).*
Espacenet English machine translation of JP2004170868A (Year: 2004).*
Espacenet English machine translation of JP2005135479A (Year: 2005).*
Notice of Reason(s) for Rejection issued on Mar. 22, 2023 in the corresponding Japanese Patent Application No. 2022-501478 (with translation) (10 pages).
English Translation of International Search Report in International Application No. PCT/JP2020/006514, mailed Apr. 21, 2020, 3 pages.
Yasuki Sakurai "Laser Processing Technique using LCOS Technology"; pp. 129-133; EKISHO, vol. 2, No. 22; published in Japan by the Japanese Liquid Crystal Society on Apr. 25, 2018 attached with Machine Translation.
Yasuki Sakurai, et al., "UV Durable LCOS for Laser Processing" by Crystals 2021, 11, 1047. https://doi.org/10.3390/cryst11091047.
English translation of the international preliminary report on patentability mailed Sep. 1, 2022 in PCT/JP2020/006514 (7 pages).

* cited by examiner

OPTICAL SYSTEM

TECHNICAL FIELD

The present disclosure relates to an optical system.

BACKGROUND ART

In recent years, use of a liquid crystal device as a spatial optical phase modulator is studied in technical fields of display technology, optical communication technology, laser processing technique, compensation optics technology, optical manipulation technology, pulse/spectrum shaping technique, and the like. As a liquid crystal device, LCOS (Liquid Crystal On Silicon) device has been already known. The inventor of the present disclosure has already disclosed a laser processing system using an LCOS device as a spatial optical phase modulator (see, Non-Patent Document 1).

PRIOR ART DOCUMENTS

Non-Patent Document

Non-Patent Document 1: Yasuki SAKURAI "Laser Processing Technique using LCOS Technology"; pages 129-133; EKISHO, vol. 2, No. 22; published in Japan by the Japanese Liquid Crystal Society on Apr. 25, 2018.

SUMMARY OF THE INVENTION

Problems to be Solved by the Invention

The inventor of the present disclosure has developed a projector that comprises a liquid crystal device as a spatial optical phase modulator and further comprises a laser light source as a light source for a spatial optical phase modulator. In this projector, for example, phase-modulated lights of colors red (R), green (G), and blue (B) are produced based on lights from laser light sources of red (R), green (G), and blue (B); and superposition of these phase-modulated lights on one another allows a projection of a colored image on a target.

In this projector, it is preferable that the liquid crystal device has a high light durability and a high response speed. To achieve the high response speed, it may be considered to make the liquid crystal device from a liquid crystal material having a high birefringence. As a liquid crystal material having a high birefringence, a tolan type liquid crystal material that includes a liquid crystal compound having a tolan structure is known.

However, a liquid crystal device that includes the tolan type liquid crystal material has relatively low durability against high-energy light. Accordingly, to increase the light durability, it may be considered to make the liquid crystal device from a non-tolan type liquid crystal material. However, use of the non-tolan type liquid crystal material causes a decrease in the response speed of the liquid crystal device.

As mentioned above, it is difficult with a known technique to manufacture a projector having both a high light durability and a high response speed when using high-energy light. This applies also to optical systems other than projectors.

It is desirable that one aspect of the present disclosure can provide a technique to enable a high light durability and a high response speed in an optical system in which two or more spatial optical phase modulators respectively produce phase-modulated lights in response to receiving light from corresponding light sources.

Means for Solving the Problems

According to one aspect of the present disclosure, an optical system is provided. The optical system comprises a first light source, a second light source, a first spatial optical phase modulator, a second spatial optical phase modulator, and a projector.

The first light source emits light having a first wavelength. The second light source emits light having a second wavelength different from the first wavelength. The first spatial optical phase modulator outputs first phase-modulated light which is based on input light having the first wavelength emitted from the first light source. The second spatial optical phase modulator outputs second phase-modulated light which is based on input light having the second wavelength emitted from the second light source. The projector projects the first phase-modulated light and the second phase-modulated light on a target.

The first spatial optical phase modulator is a liquid crystal device that includes a first liquid crystal layer for generating the first phase-modulated light from the input light having the first wavelength. The second spatial optical phase modulator is a liquid crystal device that includes a second liquid crystal layer for generating the second phase-modulated light from the input light having the second wavelength.

According to one aspect of the present disclosure, the first liquid crystal layer includes a liquid crystal material that is different from a liquid crystal material included in the second liquid crystal layer. Light durability of the liquid crystal device depends on the wavelength. For example, light absorbance of the liquid crystal device is not uniform with respect to the wavelength. The higher the light absorbance in a waveband of the input light, the lower the light durability of the liquid crystal device.

According to one aspect of the present disclosure, the first liquid crystal layer may be formed of the liquid crystal material suitable to the first wavelength; and the second liquid crystal layer may be formed of the liquid crystal material suitable to the second wavelength. This enables to achieve high light durability and a high response speed throughout the entire optical system.

According to one aspect of the present disclosure, a thickness of the first liquid crystal layer may be different from a thickness of the second liquid crystal layer. The response speed of the liquid crystal device is normally inversely proportional to the square of the thickness of the liquid crystal layer. Meanwhile, the maximum phase modulation amount of the liquid crystal device is normally proportional to a birefringence and the thickness of the liquid crystal layer and is inversely proportional to the wavelength.

In other words, the response speed is normally reduced as the thickness of the liquid crystal layer is increased. On the other hand, in order to achieve the demanded maximum phase modulation amount when the birefringence is constant, it is necessary to increase the thickness of the liquid crystal layer as the wavelength of the input light becomes longer.

According to one aspect of the present disclosure, the first liquid crystal layer may be formed of the liquid crystal material and formed into a thickness suitable to the first wavelength; and the second liquid crystal layer may be formed of the liquid crystal material and formed into a thickness suitable to the second wavelength. This enables to make the optical system excellent in its light durability and response speed.

An absorption edge wavelength of an example liquid crystal material lies in the blue waveband. According to one aspect of the present disclosure, when the second wavelength is a blue wavelength and the first wavelength is longer than the second wavelength, the second liquid crystal layer may include a liquid crystal material that has higher light durability than the first liquid crystal layer.

The liquid crystal device deteriorates due to a polymerization reaction caused by light action. This deterioration is likely to happen in the blue waveband. Therefore, according to one aspect of the present disclosure, when the second wavelength is a blue wavelength, the second liquid crystal layer may include a liquid crystal material that includes, as an additive, a polymerization inhibitor for inhibiting a polymerization reaction caused by light action. The first liquid crystal layer may include a liquid crystal material that includes the polymerization inhibitor in a smaller amount than the second liquid crystal layer does, or a liquid crystal material that does not include the polymerization inhibitor.

According to one aspect of the present disclosure, when the first wavelength is longer than the second wavelength, the first liquid crystal layer may include a liquid crystal material that has higher birefringence than the second liquid crystal layer. The maximum phase modulation amount of the liquid crystal device is normally proportional to the birefringence. By using a liquid crystal material with high birefringence, it is possible to reduce the thickness of the liquid crystal layer with respect to a desirable maximum phase modulation amount. The thickness of the liquid crystal layer affects the response speed. Accordingly, by using a liquid crystal material with high birefringence, it is possible to achieve a high response speed also to a long wavelength.

Improvement in the birefringence may be achieved by, for example, including a liquid crystal compound having a tolan structure in a liquid crystal material. Therefore, according to one aspect of the present disclosure, the first liquid crystal layer may include a liquid crystal material that includes a liquid crystal compound having a tolan structure. Meanwhile, a tolan type liquid crystal material shows low light durability in the blue waveband. Therefore, according to one aspect of the present disclosure, when the second wavelength is a blue wavelength, the second liquid crystal layer may include a liquid crystal material that includes no liquid crystal compound having a tolan structure.

According to one aspect of the present disclosure, a maximum phase modulation amount of each of the first spatial optical phase modulator and the second spatial optical phase modulator may be 2πc or greater.

According to one aspect of the present disclosure, the first light source may be a red light source. The second light source may be a blue light source. The optical system may further comprise a green light source as a third light source, and a third spatial optical phase modulator. The third spatial optical phase modulator may be configured to output third phase-modulated light which is based on input light emitted from the third light source. The projector may be configured to project the first phase-modulated light, the second phase-modulated light, and the third phase-modulated light on the target and form a color image on the target.

According to one aspect of the present disclosure, each of the first spatial optical phase modulator, the second spatial optical phase modulator, and the third spatial optical phase modulator may include an LCOS device.

EXPLANATION OF REFERENCE NUMERALS

1 . . . laser projector; 11R . . . red light source; 11G . . . green light source; 11B . . . blue light source, 13R, 13G, 13B . . . beam expanding lens; 15R, 15G, and 15B . . . spatial optical phase modulator; 17R, 17G . . . dichroic mirror; 19 . . . projection lens; 20 . . . controller; 100 . . . spatial optical phase modulator; 110 . . . silicon substrate; 120 . . . cover glass; 130 . . . transparent electrode layer; 140 . . . first orientation film layer; 150, 150R, 150G, 150B . . . liquid crystal layer; 160 . . . second orientation film layer; 170 . . . reflecting layer; 180 . . . lower electrode layer; 190 . . . circuit layer.

MODE FOR CARRYING OUT THE INVENTION

Hereinafter, example embodiments of the present disclosure will be explained with reference to the drawings.

Figure 1:
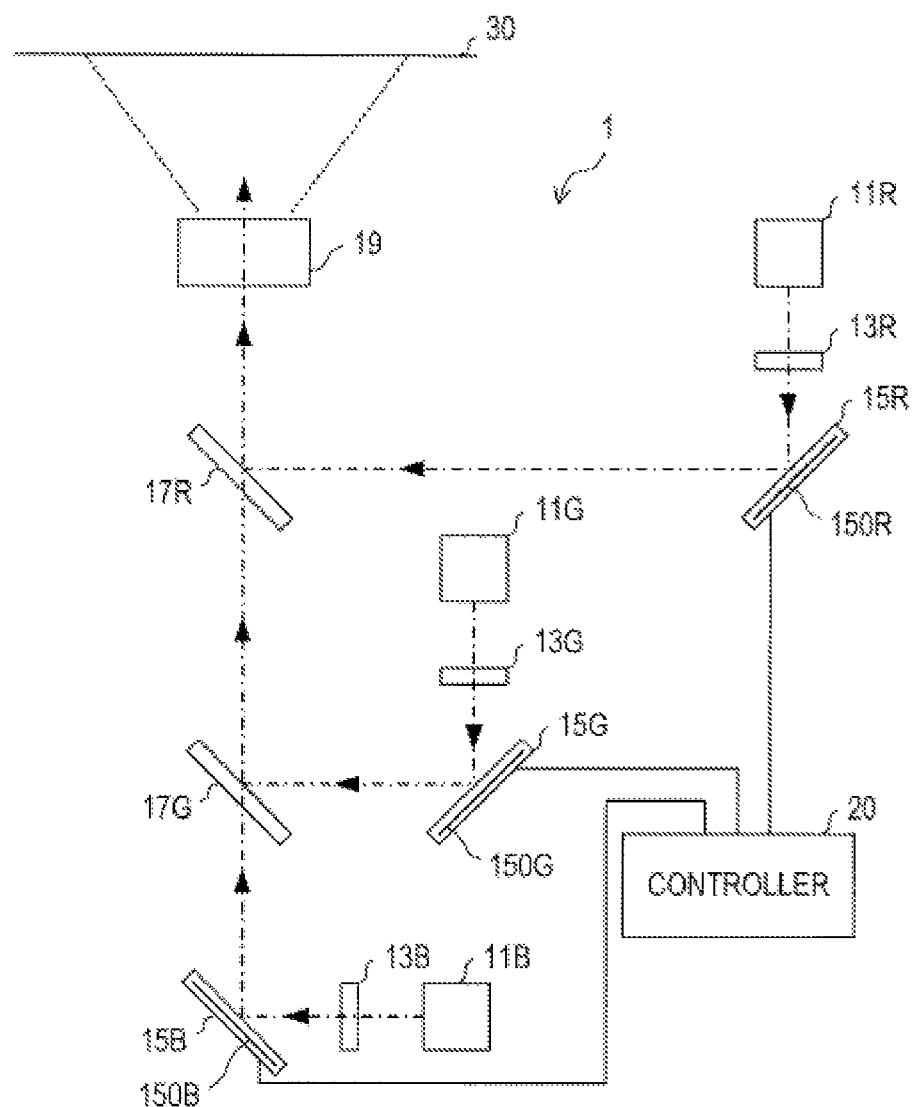
FIG. 1 is a diagram showing a schematic configuration of a laser projector.

A laser projector 1 of the present embodiment shown in FIG. 1 is configured to have phase-modulated light of red (R), green (G), and blue (B) overlap with one another and projected on a screen 30 to display a color image on the screen 30.

The laser projector 1 comprises light sources that emit light with different wavelengths. Specifically, the laser projector 1 comprises a red light source 11R, a green light source 1G, and a blue light source 11B. Hereinafter, elements that have reference numerals suffixed with "R" relate to red light; elements that have reference numerals suffixed with "G" relate to green light; and elements that have reference numerals suffixed with "B" relate to blue light.

Each of the red light source 11R, the green light source 11G, and the blue light source 11B is a laser light source that emits laser light of a corresponding color.

The laser projector 1 comprises a beam expanding lens 13R, a spatial optical phase modulator 15R, a dichroic mirror 17R, and a projection lens 19 on a transmission path for red laser light emitted from the red light source 11R. In FIG. 1, the one dot chain line extending from the red light source 11R to the projection lens 19 conceptually shows the transmission path for the red laser light.

The red laser light emitted from the red light source 11R passes through the beam expanding lens 13R and is inputted to the spatial optical phase modulator 15R. The spatial optical phase modulator 15R converts the inputted red laser light to red phase-modulated light for output. The spatial optical phase modulator 15R is a liquid crystal device, in particular an LCOS (Liquid Crystal On Silicon) device, that comprises a liquid crystal layer 150R.

The spatial optical phase modulator 15R comprises electrodes that are corresponding to pixels and two-dimensionally arrayed on the liquid crystal layer 150R. The spatial optical phase modulator 15R is configured to phase-modulate the input light for each pixel by an application of voltage from the electrodes to the liquid crystal layer 150R.

The laser projector 1 comprises a controller 20 for controlling the spatial optical phase modulator 15R. The spatial optical phase modulator 15R is controlled by the controller 20 and converts the red laser light from the red light source 11R to phase-modulated light, which corresponds to an image that should be projected on the screen 30.

The phase-modulated light is generated to have a phase distribution for forming a light intensity distribution, corresponding to the image that should be displayed, on the screen 30. The controller 20 can convert the input light into a desired phase-modulated light by using a computer generated hologram (CGH) technology.

The red phase-modulated light outputted from the spatial optical phase modulator 15R is reflected by the dichroic mirror 17R and inputted into the projection lens 19. The red phase-modulated light is projected on the screen 30 through the projection lens 19.

The laser projector 1 further comprises a beam expanding lens 13G, a spatial optical phase modulator 15G, and a dichroic mirror 17G on a transmission path for green laser light from the green light source 11G to the projection lens 19. The one dot chain line extending from the green light source 11G to the projection lens 19 in FIG. 1 conceptually shows the transmission path for the green laser light.

The green laser light emitted from the green light source 11G passes through the beam expanding lens 13O and is inputted to the spatial optical phase modulator 15G. The spatial optical phase modulator 15G converts the inputted green laser light to green phase-modulated light for output. The spatial optical phase modulator 15G is a liquid crystal device, in particular an LCOS device, that comprises a liquid crystal layer 150G. The basic structure of the spatial optical phase modulator 15G is the same as the aforementioned spatial optical phase modulator 15R.

However, the liquid crystal layer 150G of the spatial optical phase modulator 15G is configured to be suitable for a green wavelength. The liquid crystal layer 150R of the spatial optical phase modulator 15R is configured to be suitable for a red wavelength; which makes the spatial optical phase modulator 15G and the spatial optical phase modulator 15R different from each other. The basic structure of the spatial optical phase modulator 15R and the spatial optical phase modulator 15G will be explained later with reference to FIG. 2.

The spatial optical phase modulator 15G is controlled by the controller 20 and converts the green laser light from the green light source 11G to phase-modulated light, which corresponds to an image that should be projected on the screen 30. The green phase-modulated light outputted from the spatial optical phase modulator 15G is reflected by the dichroic mirror 17G towards the projection lens 19.

The green phase-modulated light reflected by the dichroic mirror 17G is transmitted through the dichroic mirror 17R and inputted to the projection lens 19. The green phase-modulated light is projected on the screen 30 through the projection lens 19.

The laser projector 1 further comprises a beam expanding lens 13B and a spatial optical phase modulator 15B on a transmission path for blue laser light from the blue light source 11B to the projection lens 19. In FIG. 1, the one dot chain line extending from the blue light source 11B to the projection lens 19 conceptually shows the transmission path for the blue laser light.

The blue laser light emitted from the blue light source 11B passes through the beam expanding lens 13B and is inputted to the spatial optical phase modulator 15B. The spatial optical phase modulator 15B converts the inputted blue laser light to blue phase-modulated light for output. The spatial optical phase modulator 15B is a liquid crystal device, in particular an LCOS device, that comprises a liquid crystal layer 150B. The basic structure of the spatial optical phase modulator 15B is the same as the aforementioned spatial optical phase modulators 15R and 15G.

However, the liquid crystal layer 150B of the spatial optical phase modulator 15B is configured to be suitable for a blue wavelength; which makes the liquid crystal layer 150B different from the aforementioned spatial optical phase modulators 15R and 15G. The spatial optical phase modulator 15B is controlled by the controller 20 and converts the blue laser light from the blue light source 11B to phase-modulated light, which corresponds to an image that should be projected on the screen 30.

The blue phase-modulated light outputted from the spatial optical phase modulator 15B is transmitted through the dichroic mirror 17G and the dichroic mirror 17R in this order and inputted to the projection lens 19. The blue phase-modulated light is projected on the screen 30 through the projection lens 19.

The red, green, and blue phase-modulated light projected on the screen 30 through the projection lens 19 is superposed on one another on the screen 30 to form one color image.

A basic structure of a spatial optical phase modulator 100 will now be explained with reference to FIG. 2. The spatial optical phase modulator 100 is a single spatial optical phase modulator representing the aforementioned spatial optical phase modulators 15R, 15G, and 15B.

Figure 2:
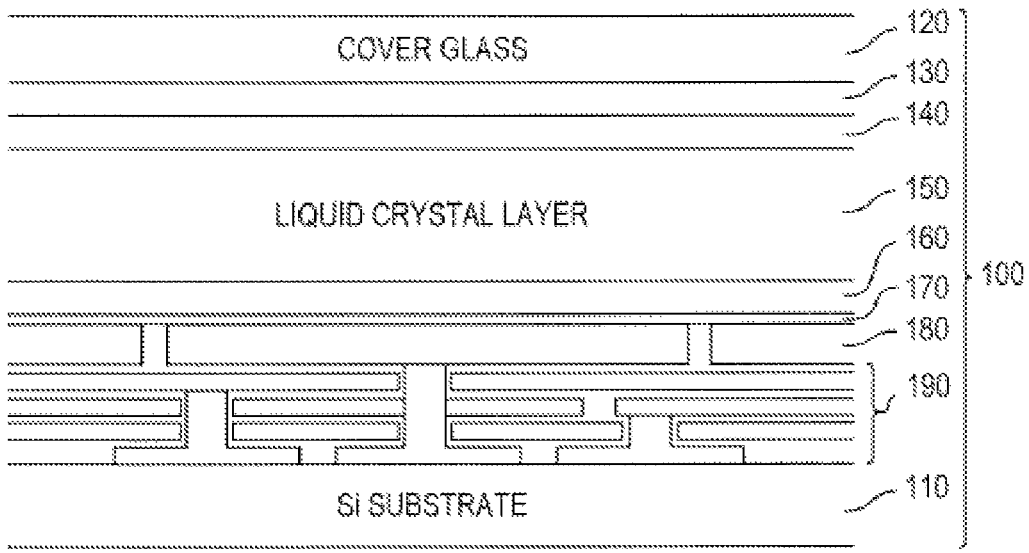
FIG. 2 is a sectional view showing an inner structure of a spatial optical phase modulator.

The spatial optical phase modulator 100 shown in FIG. 2 includes a cover glass 120, a transparent electrode layer 130, a first alignment film layer 140, a liquid crystal layer 150, a second alignment film layer 160, a reflection layer 170, a lower electrode layer 180, and a circuit layer 190 on a silicon substrate 110. The liquid crystal layer 150 corresponds to the aforementioned liquid crystal layers 150R, 150G, 150B.

The cover glass 120 is the uppermost layer of the spatial optical phase modulator 100 as a solid material layer that receives an input of light. The light from the light source is inputted into the cover glass 120. The transparent electrode layer 130 is disposed below the cover glass 120. The first alignment film layer 140, the liquid crystal layer 150, and the second alignment film layer 160 are disposed below the transparent electrode layer 130.

The first alignment film layer 140 is disposed above and adjacent to the liquid crystal layer 150. The second alignment film layer 160 is disposed below and adjacent to the liquid crystal layer 150. The first alignment film layer 140 and the second alignment film layer 160 are configured as vertical alignment films to control an initial alignment of liquid crystal molecules to be vertical with respect to each layer in the spatial optical phase modulator 100.

The liquid crystal layer 150 is disposed between the first alignment film layer 140 and the second alignment film layer 160. The liquid crystal layer 150 is affected by the first alignment film layer 140 and the second alignment film layer 160 and is configured as a vertical alignment (VA) liquid crystal layer, in which the liquid crystal molecules are vertically aligned under an electric-field-free state that is a state without an application of a voltage.

The reflection layer 170 is disposed below the second alignment film layer 160 and is configured to reflect the light, which is inputted into the cover glass 120 from above the spatial optical phase modulator 100 and propagated through the transparent electrode layer 130, the first alignment film layer 140, the liquid crystal layer 150, and the second alignment film layer 160 in this order.

A reflected light from the reflection layer 170 in response to an input light to the cover glass 120 propagates upwards through the second alignment film layer 160, the liquid crystal layer 150, the first alignment film layer 140, the transparent electrode layer 130, and the cover glass 120 in this order, and then outputted as the phase-modulated light of the input light The lower electrode layer 180 includes the electrode for each pixel, and together with the transparent electrode layer 130, receives a drive signal from the controller 20 and, in response, applies a voltage on the liquid crystal layer 150 for each pixel. This voltage application forms an electric field in the liquid crystal layer 150. Due to this formation of the electric field, a phase shift occurs in each pixel in the light passing through the liquid crystal layer 150, which enables phase modulation.

The aforementioned spatial optical phase modulators 15R, 15G, and 15B each corresponds to the spatial optical phase modulator 100 in which a liquid crystal material included in the liquid crystal layer 150 and thickness d of the liquid crystal layer 150 are appropriately selected in accordance with the wavelength of the input light. In other words, aside from the liquid crystal material and the thickness d of the liquid crystal layer, the spatial optical phase modulators 15R, 15G, and 15B may have the structure identical to the spatial optical phase modulator 100 shown in FIG. 2.

Details of the liquid crystal material and the thickness d of the liquid crystal layer will now be explained. In the laser projector 1, it is preferable that the liquid crystal layers 150R, 150G, and 150B have high response speed in order to play a moving image with reduced residual image.

Figure 3:
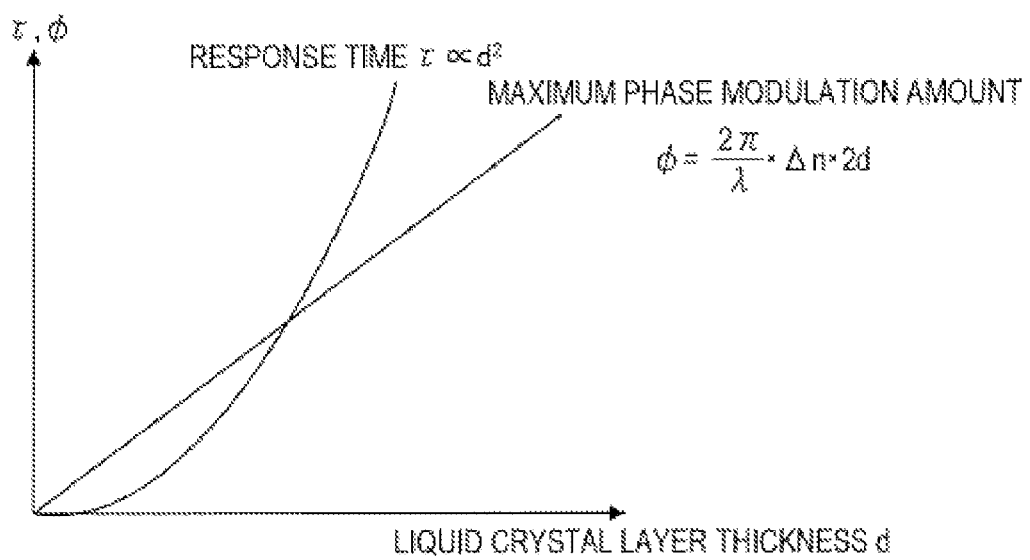
FIG. 3 is a graph showing a relationship between thickness of the liquid crystal layer, and response time and maximum phase modulation amount.

As shown in FIG. 3, a response time c of a typical spatial optical phase modulator 100 is proportional to the square of the thickness d of the liquid crystal layer. In other words, the response speed is inversely proportional to the square of the thickness d of the liquid crystal layer. This makes it clear that, in order to increase the response speed, the liquid crystal layers 150R, 150G, and 150B should be made thin.

However, in theory, maximum phase modulation amount φ of each pixel in the spatial optical phase modulator 100 is determined by an equation φ=(2π/λ)·Δn·2d. The λ is the wavelength of the input light, and the Δn is the birefringence of the liquid crystal layer 150, and the d is the thickness of the liquid crystal layer.

The maximum phase modulation amount φ required to form any phase-modulated light is 2π or greater. In other words, when considering a use of the spatial optical phase modulator 100 in the laser projector 1, the thickness d of the liquid crystal layer can be reduced only within a range where the maximum phase modulation amount φ is 2π or greater.

The response speed is accordingly restricted by such requirement of the maximum phase modulation amount φ being 2π or greater. It can also be understood that, since the maximum phase modulation amount φ is proportional to birefringence Δn, the required thickness d of the liquid crystal layer can be reduced and therefore the response speed can be increased if the liquid crystal layer 150 is formed of a liquid crystal material that has high birefringence Δn.

However, such liquid crystal material having high birefringence Δn generally has low durability against high-energy light compared with a liquid crystal material having low birefringence Δn. Therefore, in the laser projector 1 that uses laser light, which is high-energy light, selection of the liquid crystal material is restricted.

As mentioned above, the spatial optical phase modulator 100 shows a conflicting properties with respect to light durability and response speed, such that the light durability decreases when the response speed is increased, and that the response speed decreases when the light durability is increased.

Due to the aforementioned properties of the spatial optical phase modulator 100, if three identical spatial optical phase modulators 100 are prepared and arranged in the laser projector 1 as the spatial optical phase modulators 15R, 15G, and 15B, the overall response speed of the laser projector 1 would be very slow.

In other words, since it is not possible to use a liquid crystal material having high birefringence Δn when considering the light durability, it is required to select a large thickness d of the liquid crystal layer to achieve the maximum phase modulation amount φ of 2π or greater.

As mentioned above, the maximum phase modulation amount φ is inversely proportional to wavelength λ. Accordingly, if the spatial optical phase modulators 15R, 15G, and 15B are all identical spatial optical phase modulators 100, the thickness d of the liquid crystal layer 15G of the spatial optical phase modulators 100 is determined so that the maximum phase modulation amount with respect to red laser light, which has the longest wavelength λ, is 2π or greater. In this case, the thickness d of the liquid crystal layer 15G becomes very large and the response speed of the spatial optical phase modulator 100 becomes very slow.

The inventor of the present disclosure has deliberated measures to inhibit such decrease in the response speed and found that if they focus on a property of the liquid crystal material that its light absorbance usually increases in the waveband from 400 nm to 500 nm, the overall response speed of the laser projector 1 improves.

In other words, the inventor of the present disclosure has found that it is the spatial optical phase modulator 15B, which handles blue laser light, that receives a large effect on the decrease in the light durability when a liquid crystal material having high birefringence Δn is selected, and that the said effect is small on the spatial optical phase modulator 15R, which handles red laser light, compared with the spatial optical phase modulator 15B.

The inventor of the present disclosure has also found that, since the maximum phase modulation amount is inversely proportional to the wavelength λ, the spatial optical phase modulator 15R is required to have relatively high birefringence Δn among the spatial optical phase modulators 15R, 15G, and 15B.

As a result of these findings, in the present embodiment, the spatial optical phase modulators 15R, 15G, and 15B are formed of liquid crystal materials different from one another and have different thickness d of the liquid crystal layer. For each of the spatial optical phase modulators 15R, 15G, and 15B, the liquid crystal material and the thickness of the liquid crystal layer preferable to the inputted wavelength are selected in terms of the light durability and the response speed. Accordingly, in the present embodiment, high light durability and high response speed are achieved throughout the laser projector 1.

Table 1 shows examples of preferable combinations of the liquid crystal materials for the spatial optical phase modulators 15R, 15G, and 15B.

TABLE 1

|  | Red (R) | Green (G) | Blue (B) |
| --- | --- | --- | --- |
| Wavelength | 650 nm | 550 nm | 450 nin |
| Liquid Crystal Material | Tolan type | Tolan type/ Non-tolan type | Non-tolan type |
| Birefringence | N1 | N2 (≤N1) | N3 (≤SN2 and <N1) |
| Polymerization Inhibitor | Not added/ Added | Not added/ Added | Not added/ Added |

In the spatial optical phase modulator 15R that handles red laser light having a wavelength of 650 nm band, it is appropriate to use a tolan type liquid crystal material to form the liquid crystal layer 150R. The tolan type liquid crystal material in the present disclosure is a liquid crystal material containing a liquid crystal compound having a tolan structure. Hereinafter, such liquid crystal compound having the tolan structure may also be referred to as a tolan type compound.

The birefringence Δn of the liquid crystal material is improved by including the tolan type compound in the liquid crystal material. Therefore, if the liquid crystal layer 150R of the spatial optical phase modulator 15R is formed by using the tolan type liquid crystal material, it is possible to decrease the thickness d of the liquid crystal layer which is required to obtain the maximum phase modulation amount of 2n or greater. The thickness of the liquid crystal layer 150R may be arranged to be the minimum thickness that should assure the maximum phase modulation amount φ=2π.

In the spatial optical phase modulator 15B that handles blue laser light having a wavelength of 450 nm band, it is appropriate to use a non-tolan type liquid crystal material to form the liquid crystal layer 150B. The non-tolan type liquid crystal material in the present disclosure is a liquid crystal material that does not contain the tolan type compound.

Generally, liquid crystal compounds are low-molecular organic compounds, which have light sensitivity to irradiation of high-intensity light. The liquid crystal compounds are, for example, low-molecular organic compounds having stiff π-structures, flexible side chains, and polar groups.

Accordingly, in a typical liquid crystal layer 150, a part of the skeletal structure of molecules of the liquid crystal compound goes into an excited state by receiving the input light, which can generate radicals. The liquid crystal layer 150 deteriorates due to the progress of polymerization caused by chain reaction of addition of monomers with highly active radicals, generated due to an action of the input light, acting as the chain propagation center. Generation of such highly active radicals is particularly likely to happen in the tolan type compound.

In other words, compared with the non-tolan type liquid crystal material, the tolan type liquid crystal material is useful in improving the birefringence Δn but likely to cause a decrease in the light durability in the liquid crystal layer 150. Such a decrease in the light durability caused by a polymerization reaction is likely to occur in the waveband from 400 nm to 500 nm.

The maximum phase modulation amount φ is inversely proportional to the wavelength λ. Accordingly, the high birefringence Δn of the spatial optical phase modulator 15B is relatively insignificant with respect to the spatial optical phase modulator 15R. The spatial optical phase modulator 15B is required to include not a material with high birefringence Δn but a material that has high light durability. Accordingly, it is appropriate that the liquid crystal layer 150B of the spatial optical phase modulator 15B includes the non-tolan type liquid crystal material that has higher light durability than the tolan type liquid crystal material.

The spatial optical phase modulator 15G handles green laser light having a wavelength of 550 nm band. Thus, the liquid crystal layer 150G of the spatial optical phase modulator 15G may include the tolan type liquid crystal material or may include the non-tolan type liquid crystal material.

The tolan type liquid crystal material identical to or different from the one used in the spatial optical phase modulator 15R may be used to form the liquid crystal layer 150G. Examples of the different tolan type liquid crystal material include a liquid crystal material that has lower birefringence Δn and higher light durability than the tolan type liquid crystal material used in the spatial optical phase modulator 15R does.

As a consequence of such selection of materials, the birefringence Δn=N2 of the spatial optical phase modulator 15G may be set to be equal to or less than the birefringence Δn=N1 of the spatial optical phase modulator 15R. Furthermore, the birefringence Δn=N3 of the spatial optical phase modulator 15B may be set to be equal to or less than the birefringence Δn=N2 of the spatial optical phase modulator 15G and less than the birefringence Δn=N1 of the spatial optical phase modulator 15R.

The liquid crystal layers 150R, 150G, and 150B may include a liquid crystal material that contains, as an additive, a polymerization inhibitor for inhibiting a polymerization reaction caused by light action, or may include a liquid crystal material that contains no polymerization inhibitors. The liquid crystal material that contains the polymerization inhibitor as an additive may be produced by mixing the polymerization inhibitor to a liquid crystal mixture including one or more kinds of liquid crystal compounds.

The polymerization inhibitor may be produced from a stable radical compound that catches radicals, and the like. In this case, the polymerization inhibitor works to react with an active radical to inactivate the active radical. In a case where the liquid crystal layer 150 is formed from the liquid crystal material containing the polymerization inhibitor, damage to the liquid crystal layer 150 caused by radical polymerization is inhibited. In other words, the light durability is increased in the liquid crystal layer 150 containing the polymerization inhibitor.

Probability of damage due to the radical polymerization is high in the spatial optical phase modulator 15B that handles the blue laser light, but low in the spatial optical phase modulator 15R that handles the red laser light away from 500 nm band.

Therefore, according to the first example, the polymerization inhibitor may be added only to the liquid crystal layer 150B of the spatial optical phase modulator 15B but does not have to be added to the liquid crystal layer 150G of the spatial optical phase modulator 15G and the liquid crystal layer 150R of the spatial optical phase modulator 15R. According to the examples shown in Table 2, added amount of the polymerization inhibitor in the liquid crystal layer 150B may be 5 wt. % of the liquid crystal material.

TABLE 2

|  | Red (R) | Green (G) | Blue (B) |
| --- | --- | --- | --- |
| Wavelength | 650 nm | 550 nm | 450 nm |
| Added Amount of Polymerization Inhibitor (First Example) | 0% | 0% | 5% |

TABLE 2-continued

|  | Red (R) | Green (G) | Blue (B) |
| --- | --- | --- | --- |
| Added Amount of Polymerization Inhibitor (Second Example) | 1% | 2% | 5% |
| Added Amount of Polymerization Inhibitor (Third Example) | 10% | 10% | 10% |

In a case where the intensity of the laser light is high and the light durability against all waveband is required to be increased, the polymerization inhibitor may be added to all the spatial optical phase modulators 15R, 15G, and 15B According to the second example, the polymerization inhibitor may be added to the liquid crystal layers 150R, 150G, and 150B such that the added amount increases as the wavelength becomes shorter towards the blue waveband.

According to the examples shown in Table 2, the added amount of the polymerization inhibitor in the liquid crystal layer 150R may be 1 wt. % of the liquid crystal material; the added amount of the polymerization inhibitor in the liquid crystal layer 150G may be 2 wt. % of the liquid crystal material; and the added amount of the polymerization inhibitor in the liquid crystal layer 150B may be 5 wt,% of the liquid crystal material.

In a case where the light durability against all waveband is required to be increased, the polymerization inhibitor may be uniformly added to all the spatial optical phase modulators 15R, 15G, and 15B. According to the third example in Table 2, the added amount of the polymerization inhibitor in the liquid crystal layers 150R, 150G, and 150B is 10 wt. % of the liquid crystal material in each of the liquid crystal layers 150R, 150G, and 150B.

Figure 4:
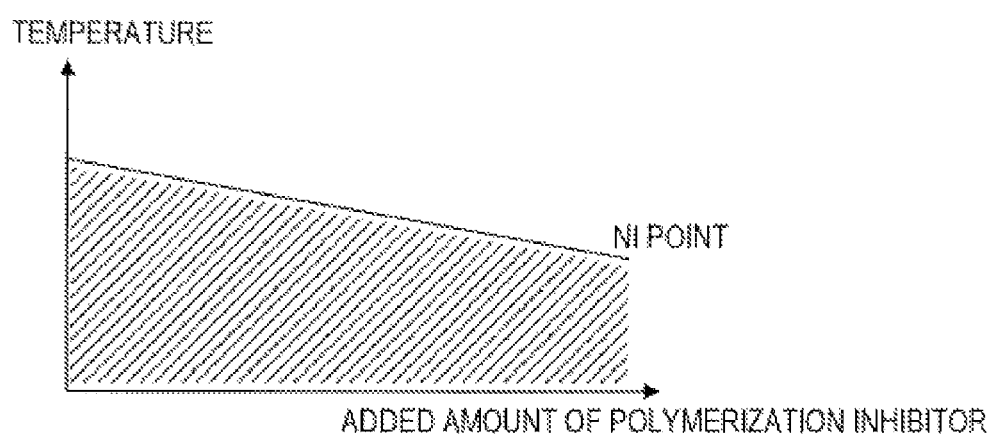
FIG. 4 is a graph showing a relationship between an addition amount of polymerization inhibitor and a NI point.

As shown in FIG. 4, a Nematic-Isotropic (NI) point, which is a boundary temperature between a liquid crystal phase and an isotropic fluid, falls as the added amount of the polymerization inhibitor increases. When the temperature of the liquid crystal material exceeds the NI point, the liquid crystal material becomes the isotropic fluid and loses the property of liquid crystal. In other words, the more the added amount of the polymerization inhibitor increases, the more the light durability of the liquid crystal layer 150 improves, but the less a range of temperature where the liquid crystal layer 150 can operate becomes. The range of temperature where the liquid crystal layer 150 can operate is shown as an area hatched with lines in FIG. 4.

Accordingly, the added amount of the polymerization inhibitor is not limited to the aforementioned examples, but may be determined to be the bare minimum considering the intensity of the laser light and light absorption property of the liquid crystal layer 150. In addition, the polymerization inhibitor may be one that shows solubility in the liquid crystal mixture but does not react to the liquid crystal mixture. Considering that it is easily soluble in the liquid crystal mixture and that it does not largely change the physical property of the liquid crystal material, an organic compound having a structure close to the liquid crystal molecular structure may be selected as the polymerization inhibitor.

An example molecular structure of the organic compound is one that has a side-chain alkyl group structure in addition to a basic structure of the polymerization inhibitor. Examples of the basic structure of the polymerization inhibitor may include hydroquinone and p-benzoquinone of quinones; o-dinitrobenzene, m-dinitrobenzene, p-dinitrobenzene, 2,4-dinitrobenzene, 1,3,5-trinitrobenzene, 1,3,5-trinitroanisole, 1,3,5-trinitrotoluene, and dinitrodurene of nitro compounds; o-nitrophenol, m-nitrophenol, p-nitrophenol, 2,4-dinitrophenol, 2,4,6-trinitrophenol, and nitroso of nitrophenols; nitrosobenzene, methyl-α-nitroso isopropyl ketone, phenyl-t-butylnitrone of nitrone compound.

The organic compound in a liquid crystal state has a structure having both an aromatic ring structure, such as benzene ring, and alkyl group. In other words, the organic compound that has a structure close to the liquid crystal molecular structure is a chemical compound having both an aromatic ring structure and an alkyl group structure.

Specific examples of the organic compound that has a structure close to the liquid crystal molecular structure include 2-dodecylphenol, 2,6-tert-butyl-p-cresol, tert-butyl hydroquinone, 4-tert-butylpyrocatechol, 2-tert-butyl-1,4-benzoquinone, 6-tert-butyl-2,4-xylenol, and 2,6-di-tert-butylphenol. These example organic compounds have alkyl group having C3, which is carbon number of 3, or more. The aforementioned organic compounds, which include alkyl group with carbon number of 3 or more, are particularly easily dissolved in the liquid crystal mixture and thus are suited for a high-concentrated addition.

One or more of organic compounds close to the above-exemplified liquid crystal molecular structures may be added to the liquid crystal mixture as the polymerization inhibitor. For example, 2-dodecylphenol (chemical formula: $C_{18}H_{30}O$; molecular weight: 262.44) may be added to the liquid crystal mixture as the polymerization inhibitor. Or, 2,6-di-tert-butyl-p-cresol (chemical formula: $C_{18}H_{24}O$; molecular weight: 220.36) may be added as the polymerization inhibitor.

In the spatial optical phase modulators 15R, 15G, and 15B, heat is generated due to light absorption. Heat generation may cause heat damages in the spatial optical phase modulators 15R, 15G, and 15B. Therefore, components of the spatial optical phase modulators 15R, 15G, and 15B, for example, the cover glass 120, the transparent electrode layer 130, a first orientation film layer 140, a second orientation film layer 160, and reflecting layer 170 may be made from materials selected by considering reduction of the heat damage.

To reduce the heat damage, a material with high heat resistance may be selected. Or, a material with good heat conductivity may be selected to quickly diffuse heat. Or, a material with good transmissivity may be selected to inhibit generation of heat due to light absorption.

For example, a material for the cover glass 120 may be selected among sapphire and quartz depending on the wavelength of the input light. The transparent electrode layer 130 may be configured as an ITO (indium tin oxide) transparent electrode layer. The first and the second orientation film layers 140, and 160 may be configured as silicon oxide (SiOx) inorganic orientation film layers.

The reflecting layer 170 may include a multilayer structure of an inorganic material. Examples of the inorganic material may include silicon dioxide ($SiO_2$), titanium oxide ($TiO_2$ or $Ti_2O_3$), and magnesium fluoride $MgF_2$. By using the multilayer structure of the inorganic material, it is possible to form the reflecting layer 170 with the transmissivity of less than 1%, which can inhibit the heat generation in the reflecting layer 170.

As it has been explained above, in the present embodiment, the liquid crystal layers 150R, 150G, and 150B of the spatial optical phase modulators 15R, 15G, and 15B that handle lights with different wavelength are each formed from the liquid crystal material appropriate for the wavelength of their input light, particularly considering light durability and response speed.

The polymerization inhibitor is added to the liquid crystal layers 150R, 150G, and 150B as necessary. Moreover, the spatial optical phase modulators 15R, 15G, and 15B are formed from a material selected by considering heat generation.

Therefore, the present embodiment can provide the laser projector 1 that has high light durability and high response speed.

It should be noted that the present disclosure should not be limited to the aforementioned embodiments and may be embodied in various modes. For example, to achieve the same response speed in Red (R), Green (G), and Blue (B), the liquid crystal layers 150R, 150G, and 150B of the spatial optical phase modulators 15R, 15G, and 15B may be formed into the same thickness d. Or, the liquid crystal layers 150R, 150G, and 150B may be individually formed into the minimum thickness to achieve the required maximum phase modulation amount 4. In this case, the response speed of each color can be maximized.

The technique of the present disclosure may be applied to various optical systems that include spatial optical phase modulators handling different wavelengths. The spatial optical phase modulator may be a liquid crystal device other than the LCOS device.

The spatial optical phase modulator is not limited to the reflective liquid crystal device shown in FIG. 2. The spatial optical phase modulator may be a transmissive liquid crystal device. The liquid crystal device may be a horizontal alignment (HA) type liquid crystal device or an IPS (In Plane Switching) type liquid crystal device.

Functions of one element in the aforementioned embodiments may be achieved by two or more elements. Functions of two or more elements in the aforementioned embodiments may be achieved by one element. A part of the configuration of the aforementioned embodiments may be omitted. Any and all modes included in the technical ideas identified by the languages recited in the claims are embodiments of the present disclosure.

The invention claimed is:

1. An optical system comprising:
a first light source configured to emit light having a first wavelength;
a second light source configured to emit light having a second wavelength different from the first wavelength;
a first spatial optical phase modulator configured to output first phase-modulated light which is based on input light having the first wavelength emitted from the first light source;
a second spatial optical phase modulator configured to output second phase-modulated light which is based on input light having the second wavelength emitted from the second light source; and
a projector configured to project the first phase-modulated light and the second phase-modulated light on a target,
wherein the first spatial optical phase modulator is a liquid crystal device that includes a first liquid crystal layer for generating the first phase-modulated light from the input light having the first wavelength,
wherein the second spatial optical phase modulator is a liquid crystal device that includes a second liquid crystal layer for generating the second phase-modulated light from the input light having the second wavelength,
wherein the first liquid crystal layer includes a liquid crystal material that is different from a liquid crystal material included in the second liquid crystal layer,
wherein the first wavelength is longer than the second wavelength,
wherein the second wavelength is a blue wavelength,
wherein the second liquid crystal layer includes a liquid crystal material that has higher light durability than the first liquid crystal layer, the liquid crystal material including, as an additive, a polymerization inhibitor for inhibiting a polymerization reaction caused by a light action, and
wherein the first liquid crystal layer includes a liquid crystal material that has a higher birefringence than the second liquid crystal layer, the liquid crystal material of the first liquid crystal layer including the polymerization inhibitor in a smaller amount than the second liquid crystal layer,
wherein the first liquid crystal layer includes a liquid crystal material that includes a liquid crystal compound having a tolan structure,
wherein the second liquid crystal layer includes a liquid crystal material that includes no liquid crystal compound having a tolan structure,
wherein the first liquid crystal layer and the second liquid crystal layer each have a thickness, and
wherein the first spatial optical phase modulator and the second spatial optical phase modulator each have a maximum phase modulation amount of $2\pi$ or greater, depending on the thickness of the first liquid crystal layer and the thickness of the second liquid crystal layer, respectively.

2. The optical system according to claim 1,
wherein the thickness of the first liquid crystal layer is different from the thickness of the second liquid crystal layer.

3. The optical system according to claim 1,
wherein the first light source is a red light source,
wherein the second light source is a blue light source,
wherein the optical system further comprising:
a green light source as a third light source; and
a third spatial optical phase modulator configured to output third phase-modulated light which is based on input light emitted from the third light source,
wherein the projector projects the first phase-modulated light, the second phase-modulated light, and the third phase-modulated light on the target and forms a color image on the target.

4. The optical system according to claim 3,
wherein each of the first spatial optical phase modulator, the second spatial optical phase modulator, and the third spatial optical phase modulator includes an LCOS device.

5. An optical system comprising:
a first light source configured to emit light having a first wavelength;
a second light source configured to emit light having a second wavelength different from the first wavelength;
a first spatial optical phase modulator configured to output first phase-modulated light which is based on input light having the first wavelength emitted from the first light source;
a second spatial optical phase modulator configured to output second phase-modulated light which is based on input light having the second wavelength emitted from the second light source; and a projector configured to project the first phase-modulated light and the second phase-modulated light on a target, wherein the first spatial optical phase modulator is a liquid crystal device that includes a first liquid crystal layer for generating the first phase-modulated light from the input light having the first wavelength, wherein the second spatial optical phase modulator is a liquid crystal device that includes a second liquid crystal layer for generating the second phase-modulated light from the input light having the second wavelength, wherein the first liquid crystal layer includes a liquid crystal material that is different from a liquid crystal material included in the second liquid crystal layer, wherein the first wavelength is longer than the second wavelength, wherein the second wavelength is a blue wavelength, wherein the second liquid crystal layer includes a liquid crystal material that has higher light durability than the first liquid crystal layer, the liquid crystal material including, as an additive, a polymerization inhibitor for inhibiting a polymerization reaction caused by a light action, and wherein the first liquid crystal layer includes a liquid crystal material that has higher birefringence than the second liquid crystal layer does, and wherein the liquid crystal material of the first liquid crystal layer includes no polymerization inhibitor, wherein the first liquid crystal layer includes a liquid crystal material that includes a liquid crystal compound having a tolan structure, wherein the second liquid crystal layer includes a liquid crystal material that includes no liquid crystal compound having a tolan structure, wherein the first liquid crystal layer and the second liquid crystal layer each have a thickness, and wherein the first spatial optical phase modulator and the second spatial optical phase modulator each have a maximum phase modulation amount of $2\pi$ or greater, depending on the thickness of the first liquid crystal layer and the thickness of the second liquid crystal layer, respectively.

6. The optical system according to claim 5, wherein t thickness of the first liquid crystal layer is different from h thickness of the second liquid crystal layer.

7. The optical system according to claim 5, wherein the first light source is a red light source, wherein the second light source is a blue light source, wherein the optical system further comprising:

a green light source as a third light source; and a third spatial optical phase modulator configured to output third phase-modulated light which is based on input light emitted from the third light source, wherein the projector projects the first phase-modulated light, the second phase-modulated light, and the third phase-modulated light on the target and forms a color image on the target.

8. The optical system according to claim 7, wherein each of the first spatial optical phase modulator, the second spatial optical phase modulator, and the third spatial optical phase modulator includes an LCOS device.

* * * * *